(12) United States Patent
Morita

(10) Patent No.: US 12,462,044 B2
(45) Date of Patent: Nov. 4, 2025

(54) INFORMATION PROCESSING DEVICE, INFORMATION PROCESSING METHOD, AND NON- TRANSITORY COMPUTER READABLE MEDIUM FOR MODIFYING NAME OF FOLDER OR FILE

(71) Applicant: FUJIFILM Business Innovation Corp., Tokyo (JP)

(72) Inventor: Toru Morita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 730 days.

(21) Appl. No.: 17/542,481

(22) Filed: Dec. 5, 2021

(65) Prior Publication Data

US 2023/0053670 A1    Feb. 23, 2023

(30) Foreign Application Priority Data

Aug. 18, 2021 (JP) ................. 2021-133245

(51) Int. Cl.
*G06F 21/60* (2013.01)
(52) U.S. Cl.
CPC ................... *G06F 21/60* (2013.01)
(58) Field of Classification Search
CPC ............... G06F 21/60; G06F 21/6209
USPC ......................................... 726/26
See application file for complete search history.

(56) References Cited

U.S. PATENT DOCUMENTS

| | | | | |
|---|---|---|---|---|
| 2003/0070071 | A1* | 4/2003 | Riedel | G06F 21/6218 713/193 |
| 2006/0072723 | A1* | 4/2006 | Chung | H04L 51/214 379/93.24 |
| 2011/0252375 | A1* | 10/2011 | Chaudhri | G06F 3/0488 715/835 |
| 2019/0294700 | A1* | 9/2019 | Lockwood | G06F 3/065 |
| 2020/0302542 | A1* | 9/2020 | Yelovitch | G06Q 40/08 |
| 2020/0319903 | A1* | 10/2020 | Cook | G06F 16/188 |

FOREIGN PATENT DOCUMENTS

| | | |
|---|---|---|
| JP | 2002312222 | 10/2002 |
| JP | 2005141351 | 6/2005 |
| JP | 2019161598 | 9/2019 |

OTHER PUBLICATIONS

"Notice of Reasons for Refusal of Japan Counterpart Application", issued on Apr. 15, 2025, with English translation thereof, pp. 1-6.

\* cited by examiner

*Primary Examiner* — Bryan F Wright
(74) *Attorney, Agent, or Firm* — JCIPRNET

(57) ABSTRACT

An information processing device includes a hardware processor. The hardware processor modifies a name of a folder or a file into a different character string with respect to the original character string describing the folder or file and output the modified character string to the terminal device when a request for displaying the name of the folder or the file stored in a memory is received from a user of the terminal device who is not granted with an access right for accessing the folder or the file stored in the memory.

11 Claims, 11 Drawing Sheets

FIG. 3A

| FILE NAME | ACCESS RIGHT | | | |
|---|---|---|---|---|
| | USER A | USER B | USER C | ... |
| 2020_0115_CustomerDirectory.pdf | NO | YES | NO | ... |
| 2020_0820_regular_pc_stock_taking.xlsx | YES | YES | NO | |
| minutes-of-meeting.xdw | YES | YES | NO | ... |
| Application_Form.doc | YES | YES | YES | |
| emergency_contact_address_book.xlsx | NO | YES | NO | |

FIG. 3B

| FOLDER NAME | ACCESS RIGHT | | | |
|---|---|---|---|---|
| | USER A | USER B | USER C | ... |
| 📁 GROUP INFORMATION | | | | ... |
| 🗀 00_MEMO | YES | YES | NO | |
| 🗀 15_ADDRESS BOOK | NO | YES | NO | ... |
| 🗀 90_CUSTOMER LIST | NO | NO | NO | |

| NAME | UPDATE TIME |
|---|---|
| 0cu3r-fujnsu89alFk.pdf | 2020/01/15 08:42 |
| 2020_0820_regular_pc_stock_taking.xlsx | 2020/08/20 14:10 |
| minutes-of-meeting.xdw | 2021/01/16 17:09 |
| Application_Form.doc | 2019/12/03 09:51 |
| Lxmx71psabCqjis.xlsx | 2021/02/01 18:40 |

W2

| NAME | UPDATE TIME |
|---|---|
| GROUP INFORMATION | |
| 00_MEMO | 2018/09/30 15:32 |
| s8a6FxcVg | 2020/04/18 11:36 |
| pt1xUalkdnart | 2020/04/27 19:24 |
| | 2020/07/11 21:55 |

FIG. 8

| NAME | UPDATE TIME |
|---|---|
| 001_0cu3r-fujnsu89alFk.pdf | 2020/01/15 08:42 |
| 002_Lxmx71psabCqjis.xlsx | 2021/02/01 18:40 |
| 2020_0820_regular_pc_stock_taking.xlsx | 2020/08/20 14:10 |
| minutes-of-meeting.xdw | 2021/01/16 17:09 |
| Application_Form.doc | 2019/12/03 09:51 |

| NAME | UPDATE TIME |
|---|---|
| 2020_011c3-unu9lk.pdf | 2020/01/15 08:42 |
| 2020_0820_regular_pc_stock_taking.xlsx | 2020/08/20 14:10 |
| minutes-of-meeting.xdw | 2021/01/16 17:09 |
| Application_Form.doc | 2019/12/03 09:51 |
| emerxx1sbqi.xlsx | 2021/02/01 18:40 |

| FILE NAME | ACCESS RIGHT | |
|---|---|---|
| | BROWSING RIGHT | EDITING RIGHT |
| 2020_0115_CustomerDirectory.pdf | NO | NO |
| 2020_0820_regular_pc_stock_taking.xlsx | YES | YES |
| minutes-of-meeting.xdw | YES | YES |
| Application_Form.doc | YES | YES |
| emergency_contact_address_book.xlsx | YES | NO |

INFORMATION PROCESSING DEVICE, INFORMATION PROCESSING METHOD, AND NON- TRANSITORY COMPUTER READABLE MEDIUM FOR MODIFYING NAME OF FOLDER OR FILE

CROSS-REFERENCE TO RELATED APPLICATIONS

This application is based on and claims priority under 35 USC 119 from Japanese Patent Application No. 2021-133245 filed Aug. 18, 2021.

BACKGROUND (i) Technical Field

The present disclosure relates to an information processing device, an information processing method, and a non-transitory computer readable medium.

(ii) Related Art

An encrypted file management device that, when granting a person access to an encrypted file, converts the file name of the encrypted file and generates a temporary file name that is unrelated to the original file name is disclosed as a known technology in Japanese Unexamined Patent Application Publication No. 2002-312222.

SUMMARY

In the case where the name of a folder or file which is stored in an information processing device and to which a user of a terminal device is not granted an access right is displayed on the terminal device without the name of the folder or file being modified, the user who is not granted the access right to access the folder or file may be able to guess the contents of the folder or file from the displayed name.

Aspects of non-limiting embodiments of the present disclosure relate to preventing a user who is not granted an access right to access a folder or file from being able to guess the contents of the folder or file, compared to a case where the name of the folder or file is not modified.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to, in a case where a request for displaying a name of a folder or a file stored in a memory is received from a terminal device, modify a name of a folder or a file to which a user of the terminal device is not granted an access right into a different character string and output the modified character string to the terminal device.

BRIEF DESCRIPTION OF THE DRAWINGS

Exemplary embodiments of the present disclosure will be described in detail based on the following figures, wherein:

FIGS. 3A and 3B are diagrams illustrating examples of additional information of files and folders stored in a storing unit;

FIG. 6 is a diagram illustrating an example of display on a display unit of a terminal device in the case where a display request for displaying the names of the files illustrated in FIG. 3A and the folders illustrated in FIG. 3B is made by a user;

FIG. 8 is a diagram illustrating an example of display on the display unit of the terminal device in the case where a display request for displaying the names of the files illustrated in FIG. 3A is made by the user;

FIG. 9 is a diagram illustrating an example of display on the display unit of the terminal device in the case where a display request for displaying the names of the files illustrated in FIG. 3A is made by the user;

FIG. 10 is a diagram illustrating an example of additional information of files stored in the storing unit and illustrates the names of the files and information of the access right to access the files granted to the user.

DETAILED DESCRIPTION

Exemplary embodiments of the present disclosure will be described below with reference to the drawings.

First Exemplary Embodiment

<Information Processing System 1>

Figure 1:
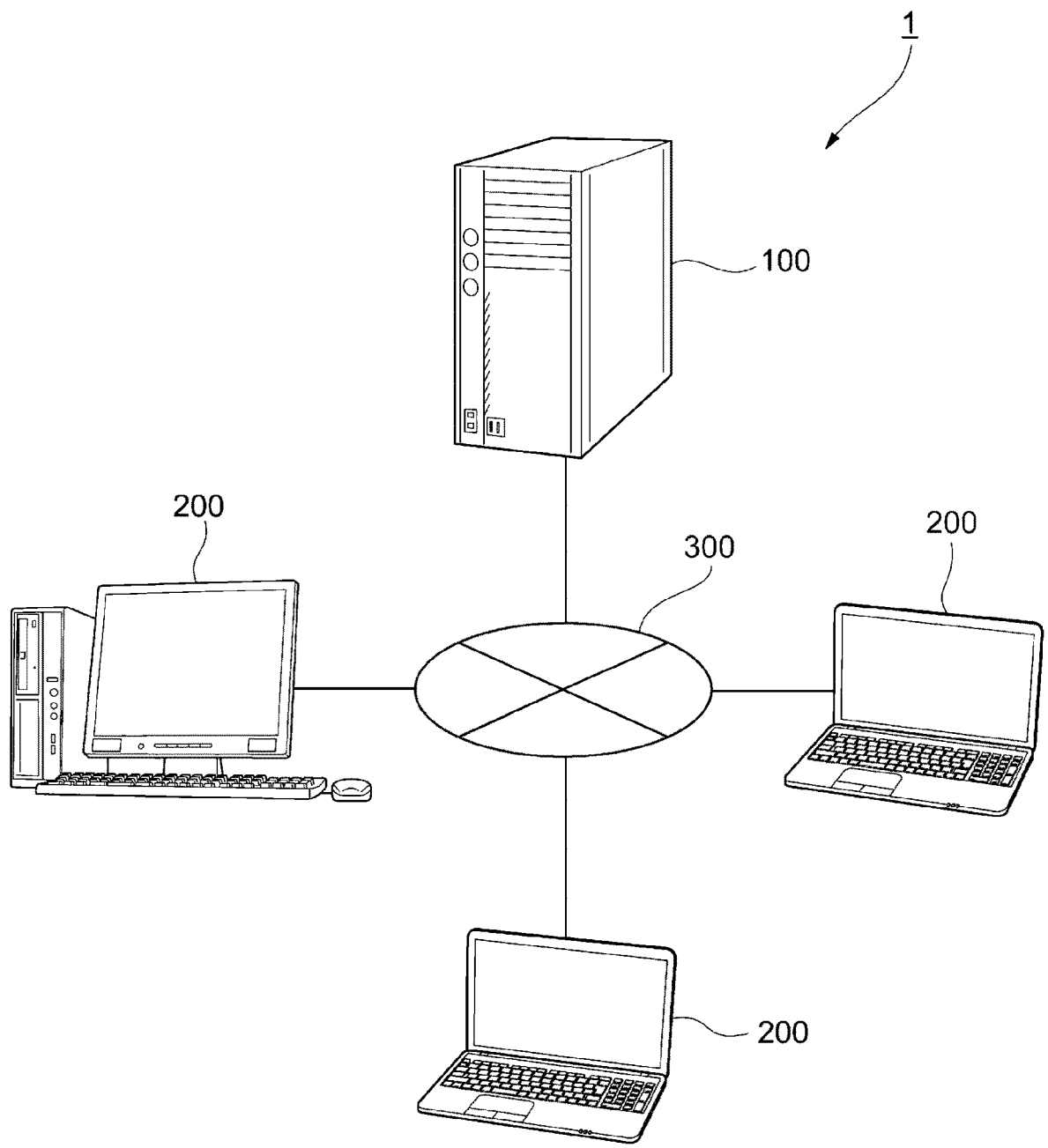
FIG. 1 is a diagram illustrating an example of the entire configuration of an information processing system according to an exemplary embodiment.

FIG. 1 is a diagram illustrating an example of the entire configuration of an information processing system 1 according to an exemplary embodiment. As illustrated in FIG. 1, the information processing system 1 includes an information processing device 100 and a plurality of terminal devices 200 connected to the information processing device 100. In the information processing system 1, the information processing device 100 and the terminal devices 200 are connected via a communication line 300 such as an internet line. Furthermore, the information processing device 100 and the terminal devices 200 are, for example, computers such as personal computers (PCs).

<Information Processing Device 100>

Figure 2:
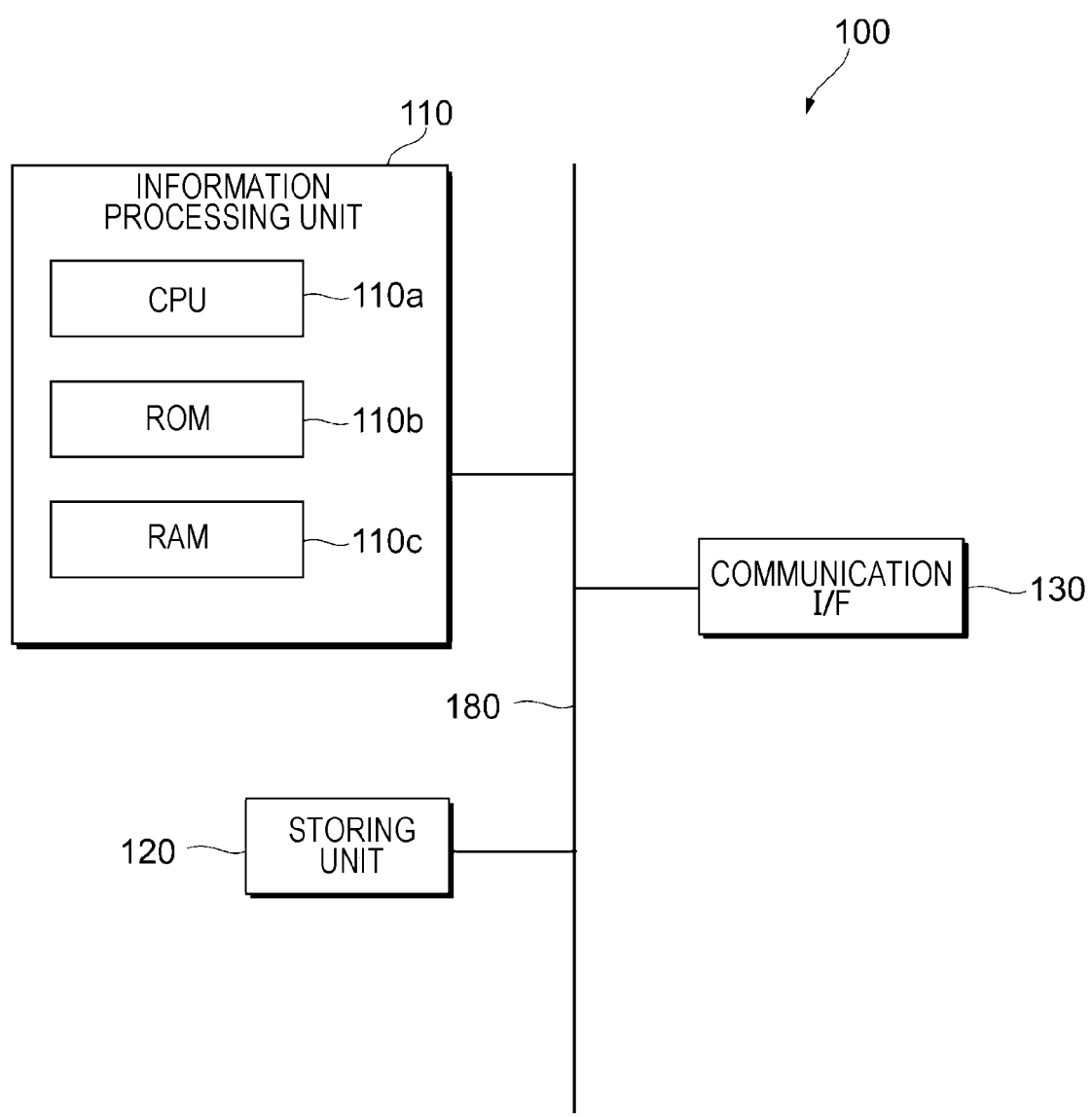
FIG. 2 is a diagram illustrating an example of the hardware configuration of an information processing device.

Next, a hardware configuration of the information processing device 100 according to this exemplary embodiment will be described. FIG. 2 is a diagram illustrating an example of the hardware configuration of the information processing device 100.

As illustrated in FIG. 2, the information processing device 100 includes an information processing unit 110 that processes information, a storing unit 120 that stores information, and a communication interface (communication I/F) 130 that performs communications. Furthermore, the information processing unit 110, the storing unit 120, and the communication I/F 130 in the information processing device 100 are connected to a bus 180, so that the information processing unit 110, the storing unit 120, and the communication I/F 130 transmit and receive data via the bus 180.

The information processing unit 110 includes, as illustrated in FIG. 2, a central processing unit (CPU) 110a, a read only memory (ROM) 110b, and a random access memory (RAM) 110c.

The CPU 110a is an example of a processor. The CPU 110a implements functions described below by loading various programs stored in the ROM 110b or the like to the RAM 110c and executing the various programs. The RAM 110c is a memory used as an operation memory or the like for the CPU 110a. The ROM 110b is a memory storing various programs and the like to be executed by the CPU 110a.

A program to be executed by the CPU 110a may be stored in a computer-readable recording medium such as a magnetic recording medium (a magnetic tape, a magnetic disk, or the like), an optical recording medium (an optical disc or the like), a magneto-optical recording medium, or a semiconductor memory and provided to the terminal devices 200. Furthermore, a program to be executed by the CPU 110a may be provided to the terminal devices 200 through communication such as the Internet.

The storing unit 120 is an example of a memory. The storing unit 120 includes, for example, a hard disk drive (HDD) and stores various data.

Specifically, the storing unit 120 in this exemplary embodiment stores information of files and folders that the users of the terminal devices 200 are able to use.

A file includes a set of data in predetermined units. Such a file is, for example, a document file, an image file, a video file, or an audio file. A file includes content, which is the entity of the file, and additional information added to the content. Content is, for example, document data in a document file, image data in an image file, video data in a video file, audio data in an audio file, or the like. Furthermore, additional information of a file is information indicating attributes and settings of content. Additional information of a file includes, for example, the name of the file, information of the access right granted or not granted to users of the terminal devices 200, the created date and time of the file, the updated date and time of the file, a creator of the file, and the like.

The name of a file is information provided to identify the file. The name of a file typically represents a file name unique to the file and the type and format of the file and contains an extension provided to the ending of the file name.

A folder stores files or other folders that are formed into a group. A folder does not necessarily store a file or another folder. That is, a folder may be empty.

A folder contains additional information indicating attributes and settings of the folder as well as information regarding files and the like stored. Additional information of a folder includes, for example, the name of the folder, information of the access right granted or not granted to the users of the terminal devices 200, the created date and time of the folder, the updated date and time of the folder, a creator of the folder, and the like.

The name of a folder is information provided to identify the folder and is unique to the folder.

An access right to access a folder or file granted to a user represents the right of the user to perform a predetermined operation on the target folder, the target file, or a file stored in the target folder. There may be multiple types of access rights depending on target operations. Such access rights include, for example, a browse right to browse contents of a folder or file, an editing right to edit contents of a folder or file, and the like but are not limited to the rights mentioned above.

FIGS. 3A and 3B are diagrams illustrating examples of additional information of files and folders stored in the storing unit 120. FIG. 3A illustrates an example of additional information of files, and FIG. 3B illustrates an example of additional information of folders. In FIGS. 3A and 3B, the names of the files and the folders and information of the access right to access the files and the folders granted or not granted to users are illustrated as additional information of the files and the folders.

As illustrated in FIGS. 3A and 3B, information regarding whether or not users operating the terminal devices 200 (in this case, user A, user B, and user C) are granted the access right to access the files and the folders is stored in the storing unit 120.

Furthermore, information of users operating the terminal devices 200 is also stored in the storing unit 120. As information of a user, for example, identification information for identifying the user is stored in the storing unit 120. Identification information represents information for identifying a user out of a plurality of users and includes, for example, a user name, an ID allocated to the user, or the like. Furthermore, authentication information such as a password used by the information processing unit 110 for authenticating a user may be stored in the storing unit 120.

The storing unit 120 stores information regarding a modification rule to be used by the information processing unit 110 for modification processing for the name of a folder or file. The modification rule will be described later.

Furthermore, the storing unit 120 may store the modified name of a folder or file whose name has been modified by the information processing unit 110.

<Terminal Device 200>

Figure 4:
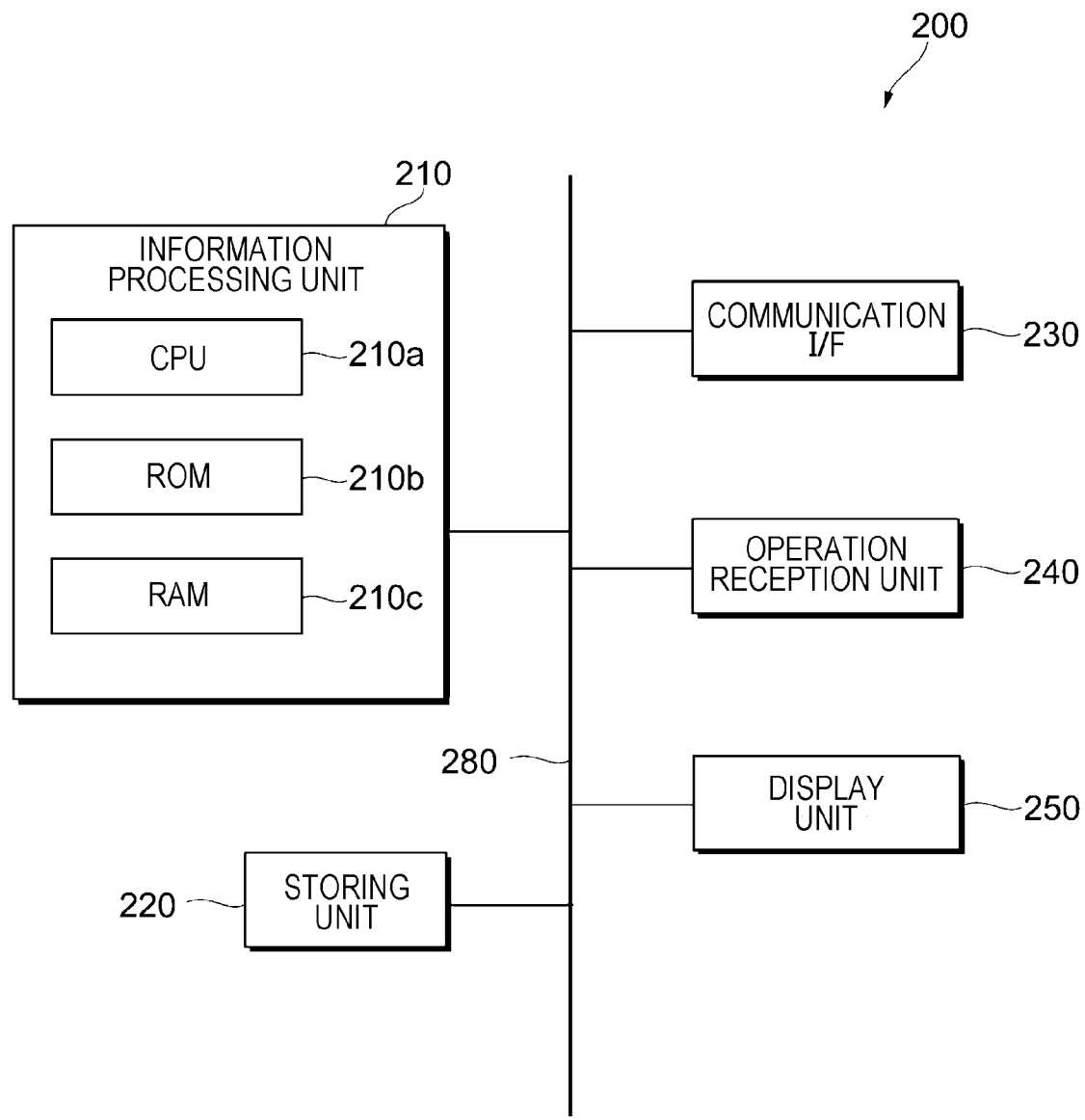
FIG. 4 is a diagram illustrating an example of the hardware configuration of a terminal device.

Next, a hardware configuration of the terminal devices 200 in this exemplary embodiment will be described. FIG. 4 is a diagram illustrating a hardware configuration of the terminal devices 200.

As illustrated in FIG. 4, each of the terminal devices 200 includes an information processing unit 210 that includes a CPU 210a a ROM 210b, and a RAM 210c and processes information, a storing unit 220 that stores information, and a communication interface (communication I/F) 230 that performs communication. The terminal device 200 also includes an operation reception unit 240 that receives an operation performed by a user and a display unit 250 that displays information. The information processing unit 210, the storing unit 220, the communication I/F 230, the operation reception unit 240, and the display unit 250 in the terminal device 200 are connected to a bus 280 and transmit and receive data via the bus 280.

The operation reception unit 240 includes, for example, a mouse, a keyboard, a touch panel, or the like. The operation reception unit 240 is used by the user of the terminal device 200 to input information to the information processing system 1. In this exemplary embodiment, the operation reception unit 240 is used by the user to request display of the list of folders or files stored in the information processing device 100.

The display unit 250 includes, for example, a liquid crystal display, an organic electroluminescence (EL) display, or the like.

As described in detail later, the user of the terminal device 200 in this exemplary embodiment operates the operation reception unit 240 and transmits to the information processing device 100 a display request for displaying the names of folders or files stored in the storing unit 120 of the information processing device 100. The terminal device 200 receives from the information processing device 100 information (an output list, which will be described later) including the names of the folders or files for which the display request has been made, and displays the names of the folders or files on the display unit 250.

<Process Performed by Information Processing Device 100>

In the information processing system 1 according to this exemplary embodiment, when the terminal device 200 transmits to the information processing device 100 a display request for displaying the names of folders or files stored in the storing unit 120, the information processing device 100 performs a process for modifying the name of a folder or file to which the user of the terminal device 200 is not granted the access right.

Figure 5:
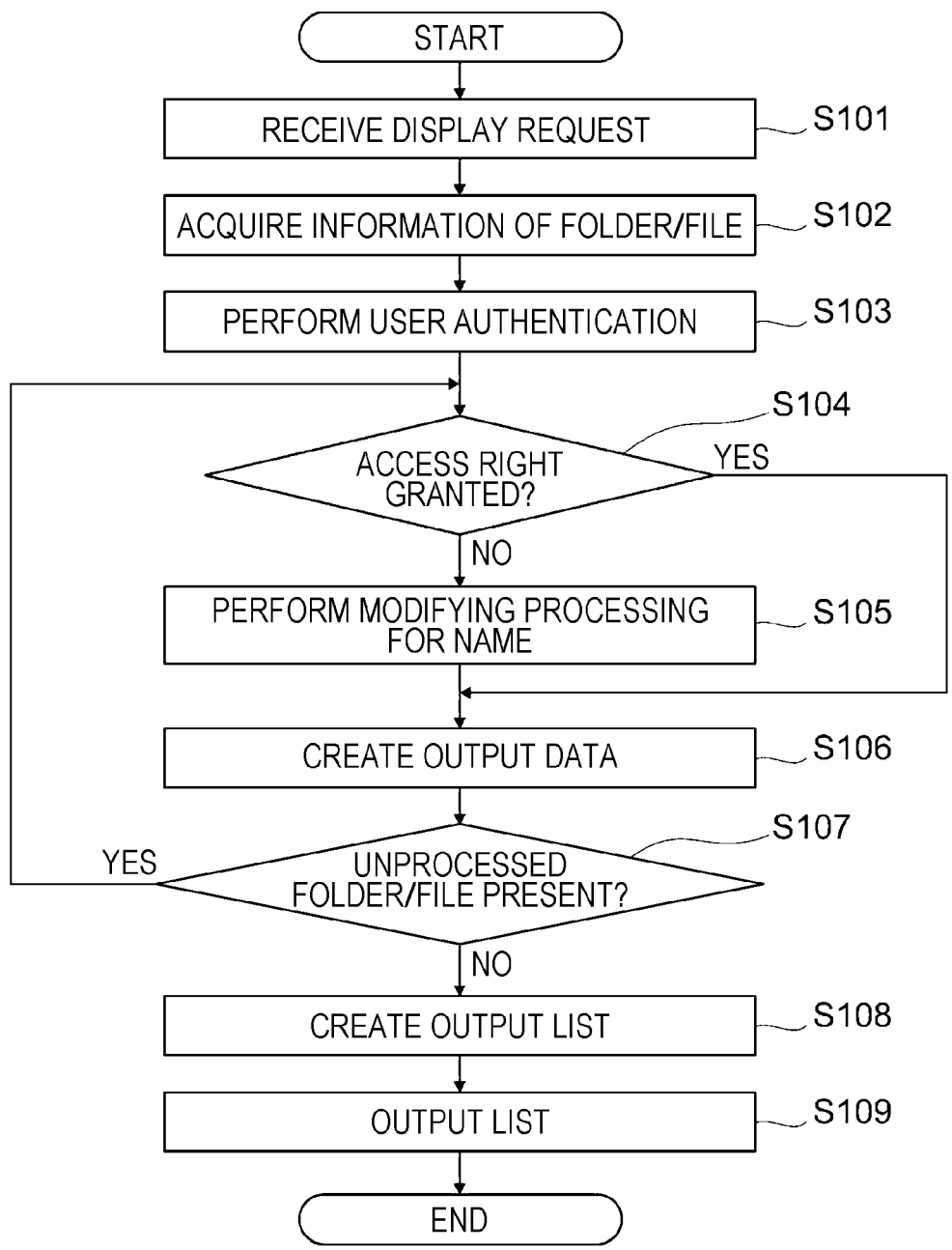
FIG. 5 is a flowchart illustrating an example of a process performed by an information processing unit in an exemplary embodiment.

Next, an operation performed by the information processing system 1 according to this exemplary embodiment will be described with reference to a flowchart focusing on a process performed by the information processing unit 110 of the information processing device 100. FIG. 5 is a flowchart illustrating an example of a process performed by the information processing unit 110 in this exemplary embodiment.

First, the user of the terminal device 200 operates the operation reception unit 240 of the terminal device 200 and selects one or more folders or files out of folders or files stored in the storing unit 120. Then, the user of the terminal device 200 transmits to the information processing device 100 a display request for displaying the names of the selected one or more folders or files on the display unit 250.

In the information processing device 100, the information processing unit 110 receives the display request from the terminal device 200 (step 101).

The information processing unit 110 may receive a display request for, for example, multiple folders or files that have been formed into a group and stored in a folder or a single folder or file.

Next, the information processing unit 110 acquires from the storing unit 120 information of the one or more folders or files for which the display request is received in step 101 (step 102).

In step 102, the information processing unit 110 acquires, as the information of the one or more folders or files, at least information of the access right set for each of the one or more folders or files and the name of the folder or file in additional information the folder or file from the storing unit 120.

Next, the information processing unit 110 performs authentication of the user of the terminal device 200 from which the display request is received in step 101 (step 103).

A method for performing authentication of a user is not particularly limited. For example, the information processing unit 110 transmits via the communication I/F 130 to the terminal device 200 a transmission request for transmitting identification information for identifying the user and authentication information to be used for authentication of the user. When receiving the transmission request, the user operates the operation reception unit 240 of the terminal device 200 to cause the terminal device 200 to transmit the identification information and the authentication information to the information processing device 100. In the information processing device 100, the information processing unit 110 identifies and authenticate the user of the terminal device 200 on the basis of the identification information and the authentication information transmitted from the terminal device 200.

Next, the information processing unit 110 determines, based on the information of the access right acquired in step 102, whether or not the user authenticated in step 103 is granted the access right to access a folder or file (hereinafter, referred to as a target folder or a target file) out of the one or more folders or files for which the display request is received in step 101 (step 104).

In the case where the user is granted the access right to access the target folder or file (YES in step 104), the information processing unit 110 proceeds to step 106 and continues the process.

In contrast, in the case where the user is not granted the access right to access the target folder or file (NO in step 104), the information processing unit 110 performs modification processing for modifying the name of the target folder or file (step 105). In other words, the information processing unit 110 performs modification processing for modifying the name of the folder or file to which the user is not granted the access right into a character string different from the original name before modification. The modification processing for modifying the name of a folder or file will be described in detail later.

Next, the information processing unit 110 creates output data to be output to the terminal device 200 for the target folder or file (step 106). The output data is information to be displayed on the display unit 250 of the terminal device 200 and contains the name of the target folder or file. In the case where the user is not granted the access right to access the target folder or file and the modification processing for modifying the name of the folder or file has been performed in step 105, the information processing unit 110 uses the modified name of the folder or file as the output data. In contrast, in the case where the user is granted the access right to access the target folder or file, the information processing unit 110 uses the original name of the target folder or file as the output data.

Next, the information processing unit 110 determines whether or not an unprocessed folder or file that has not been processed in steps 104 to 106 is present in the one or more folders or files acquired in step 102 (step 107).

In the case where an unprocessed folder or file is present (YES in step 107), the information processing unit 110 returns to step 104 and continues the process.

In contrast, in the case where no unprocessed folder or file is present (NO in step 107), the information processing unit 110 forms output data for the folders or files created in step 106 into a group to create an output list composed of the group of folders or files (step 108). The output list includes the names of all the folders or files acquired in step 102. More specifically, the output list includes the original names of the folders or files acquired in step 102 to which the user is granted the access right and the modified names of the folders or files acquired in step 102 to which the user is not granted the access right.

Next, the information processing unit 110 outputs the output list created in step 108 to the terminal device 200 via the communication I/F 130 (step 109).

The terminal device 200 receives the output list, and displays, under the control of the information processing unit 210, the names of the folders or files included in the output list on the display unit 250. Accordingly, on the display unit 250, the modified names obtained in step 105 are displayed for the folders or files to which the user of the terminal device 200 is not granted the access right. In contrast, the original names are displayed for the folders or files to which the user of the terminal device 200 is granted the access right.

Typically, a character string related to the contents of a folder or file is often used for the name of the folder or file. In the case where the original name of a folder or file to which the user of the terminal device 200 is not granted the access right is displayed on the display unit 250, the user may be able to guess the contents of the folder or file from the displayed name.

According to this exemplary embodiment, however, modification processing for modifying the name of a folder or file to which a user is not granted the access right is performed by the information processing unit 110 of the information processing device 100. Accordingly, the original name of the folder or file to which the user is not granted the access right is not displayed but the modified name of the folder or file is displayed on the display unit 250. Consequently, compared to the case where the original name of a folder or file to which a user is not granted the access right is displayed on the display unit 250, the user is prevented from being able to guess the contents of the folder or file from the displayed name.

<Modification Processing>

As described above, the information processing unit 110 in this exemplary embodiment modifies the name of a folder or file to which a user is not granted the access right into a character string different from the original name. The modified character string is not particularly limited as long as it is different from the original name. The information processing unit 110 may, for example, modify the name of a folder or file to which a user is not granted the access right into a meaningless character string. Furthermore, the information processing unit 110 may modify the name of a folder or file to which a user is not granted the access right into a character string containing a specific character string satisfying a predetermined condition.

Furthermore, the information processing unit 110 may perform modification in accordance with a predetermined modification rule. The predetermined modification rule is not particularly limited as long as the name of a folder or file is modified into a character string different from the original name. The modification rule may be, for example, an encryption key for encrypting the original name of a folder or file into a meaningless character string. An encryption method of an encryption key used for modification processing for the name of a folder or file is not particularly limited and may be a common key cryptosystem or a public key cryptosystem. Furthermore, the modification rule may be a conversion formula, a conversion table, or the like for replacing the original name of a folder or file with a predetermined word or character. Furthermore, the information processing unit 110 may use a combination of multiple modification rules.

Next, specific examples of modification processing performed by the information processing unit 110 of the information processing device 100 for modifying the name of a folder or file will be described in detail.

EXAMPLE 1 OF MODIFICATION PROCESSING

An example of the case where a display request for displaying the names of the files illustrated in FIG. 3A and the folders illustrated in FIG. 3B is made by the user A of the terminal device 200 (hereinafter, may be simply referred to as a user) will be described.

FIG. 6 is a diagram illustrating an example of display on the display unit 250 of the terminal device 200 in the case where a display request for displaying the name of the files illustrated in FIG. 3A and the folders illustrated in FIG. 3B is made by the user.

As illustrated in FIG. 3A, the user is not granted the access right to access two files, "2020_0115_CustomerDirectory.pdf" and "emergency_contact_address_book.xlsx", out of five files, "2020_0115_CustomerDirectory.pdf", "2020_0820_regular_pc_stock_taking.xlsx", "minutes-of-meeting.xdw", "Application_Form.doc", and "emergency_contact_address_book.xlsx", for which a display request has been made.

In this case, the information processing unit 110 performs modification processing for modifying the names of the files "2020_0115_CustomerDirectory.pdf" and "emergency_contact_address_book.xlsx".

In this example, the information processing unit 110 modifies the name of a file to which the user is not granted the access right into a meaningless character string.

Specifically, the information processing unit 110 modifies a unique file name part "2020_0115_CustomerDirectory" of the name "2020_0115_CustomerDirectory.pdf" of the file to which the user is not granted the access right into a meaningless character string "0cu3r-fujnsu89alFk". In a similar manner, the information processing unit 110 modifies a unique file name part "emergency_contact_address_book" of the name "emergency_contact_address_book.xlsx" of the file to which the user is not granted the access right into a meaningless character string "Lxmx71psabCqjis". In this example, extensions in the file names are maintained without being modified.

Furthermore, as illustrated in FIG. 3B, the user is not granted the access right to access two folders, "15_Address book" and "90_Customer list", out of three folder lists for which a display request has been made.

In this case, as in the examples of the files described above, the information processing unit 110 modifies the names of the folders "15_Address book" and "90_Customer list" into meaningless character strings. Specifically, the information processing unit 110 modifies the name "15_Address book" of the folder to which the user is not granted the access right into a meaningless character string "s8a6FxcVg". In a similar manner, the information processing unit 110 modifies the name "90_Customer list" of the folder to which the user is not granted the access right to a meaningless character string "pt1xUalkdnart".

In contrast, the information processing unit 110 does not modify the names "2020_0820_regular_pc_stock_taking.xlsx", "minutes-of-meeting.xdw", and "Application_Form.doc" of the files to which the user is granted the access right and the name "00_Memo" of the folder to which the user is granted the access right.

The information processing unit 110 outputs, as output data, the modified names of the folders or files to which the user is not granted the access right and the original names of the folders or files to which the user is granted the access right to the terminal device 200.

The terminal device 200 displays, under the control of the information processing unit 210, the output data received from the information processing device 100 on the display unit 250.

Specifically, as illustrated in FIG. 6, the terminal device 200 displays, as a window W1, the names of the files for which the user has made a display request on the display unit 250. In the window W1, the modified names "0cu3rfujnsu89alFk.pdf" and "Lxmx71psabCqjis.xlsx", which are meaningless character strings, of the files "2020_0115_CustomerDirectory.pdf" and "emergency_contact_address_book.xlsx" to which the user is not granted the access right are displayed.

Accordingly, even when the user sees the names of the files displayed in the window W1, the user is prevented from being able to guess the contents of the "2020_0115_CustomerDirectory.pdf" and "emergency_contact_address_book.xlsx" to which the user is not granted the access right.

In a similar manner, as illustrated in FIG. 6, the terminal device 200 displays, as a window W2, the names of the folders for which the user has made a display request on the display unit 250. In the window W2, the modified names "s8a6FxcVg" and "pt1xUalkdnart", which are meaningless character strings, of the folders "15_Address book" and "90_Customer list" to which the user is not granted the access right are displayed. Accordingly, even when the user sees the names of the folders displayed in the window W2, the user is prevented from being able to guess the contents of the folders "15_Address book" and "90_Customer list" to which the user is not granted the access right.

In contrast, in the window W1, the original names of the files "2020_0820_regular_pc_stock_taking.xlsx", "minutes-of-meeting.xdw", and "Application_Form.doc" to which the user is granted the access right are displayed. In a similar manner, in the window W2, the original name of the folder "00_Memo" to which the user is granted the access right is displayed.

Accordingly, the user is able to guess the contents of the files and the folder from the displayed names of the files of the folder and to perform operations such as browsing and editing of the files and the folder as necessary.

EXAMPLE 2 OF MODIFICATION PROCESSING

An example of the case where a display request for displaying the names of the files illustrated in FIG. 3A is made by the user A of the terminal device 200 (hereinafter, may be simply referred to as a user) will be described. Although the example of the names of the files will be described below, similar processing may be performed for the names of folders.

Figure 7:
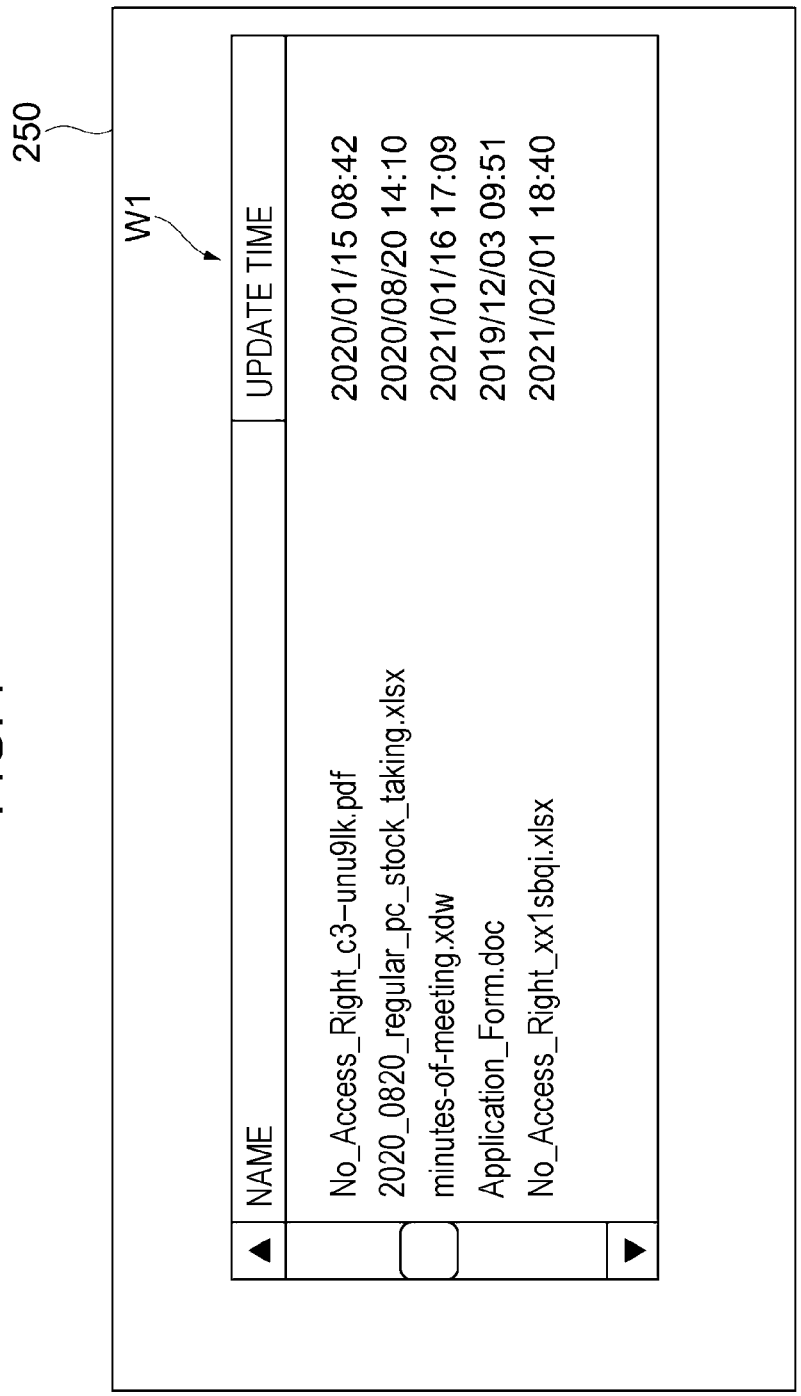
FIG. 7 is a diagram illustrating an example of display on the display unit of the terminal device in the case where a display request for displaying the names of the files illustrated in FIG. 3A is made by the user.

FIG. 7 is a diagram illustrating an example of display on the display unit 250 of the terminal device 200 in the case where a display request for displaying the names of the files illustrated in FIG. 3A is made by the user.

The information processing unit 110 modifies the name of a file to which the user is not granted the access right into a character string containing a specific character string satisfying a predetermined condition. Because the modified name of a file to which the user is not granted the access right contains a specific character string, when the modified name is displayed on the display unit 250 of the terminal device 200, information indicating that the access right is not granted may be provided to the user or a plurality of files may be rearranged, in accordance with the specific character string.

In this example, the information processing unit 110 modifies the name of a file to which the user is not granted the access right into a character string containing an expression indicating that the access right is not granted. The expression indicating that the access right is not granted is an example of the specific character string satisfying the predetermined condition.

The expression indicating that the access right is not granted is an expression that allows a user to recognize that the user is not granted the access right to access a file when the user visually recognizes the expression. The expression indicating that the access right is not granted may be a single word or a compound composed of multiple words, a sentence, or the like. Such an expression indicating that the access right is not granted is not particularly limited and may be, for example, "No_Access_Right", "Browsing_Not_Allowed", "Access_Right_Not_Granted", or the like.

The information processing unit 110 modifies a unique file name part "2020_0115_CustomerDirectory" of the name "2020_0115_CustomerDirectory.pdf" of the file to which the user is not granted the access right into a character string "No_Access_Right_c3-unu9lk", which is the combination of the expression "No_Access_Right" indicating that the access right is not granted and the meaningless character string "c3-unu9lk". In a similar manner, the information processing unit 110 modifies a unique file name part "emergency_contact_address_book" of the name "emergency_contact_address_book.xlsx" of the file to which the user is not granted the access right into a character string "No_Access_Right_xx1sbqi", which is the combination of the expression "No_Access_Right" indicating that the access right is not granted and a meaningless character string "xx1sbqi". In this example, extensions in the names of the files are maintained without being modified.

Then, the terminal device 200 displays, as the window W1, the names of the files for which the user has made a display request on the display unit 250. Specifically, as illustrated in FIG. 7, in the window W1, the modified names "No_Access_Right_c3-unu9lk.pdf" and "No_Access_Right_xx1sbqi.xlsx", which are combinations of the expression indicating that the access right is not granted and the meaningless character strings, are displayed for the files "2020_0115_CustomerDirectory.pdf" and "emergency_contact_address_book.xlsx" to which the user is not granted the access right.

Accordingly, even when the user sees the names of the files displayed in the window W1, the user is prevented from being able to guess the contents of the files "2020_0115_CustomerDirectory.pdf" and "emergency_contact_address_book.xlsx" to which the user is not granted the access right.

Furthermore, in this example, the modified names of the files to which the user is not granted the access right contain the expression indicating that the access right is not granted.

Typically, in the case where the names of files stored in the information processing device 100 are displayed on the display unit 250 of the terminal device 200, a user needs to perform a further operation to confirm whether or not the user is granted the access right to access the files. Specifically, to confirm whether or not the user is granted the access right to access a file, the user needs to access the file or display a display screen (for example, a property screen) for displaying information regarding the access right to access the file.

In contrast, in this example, the modified name of a file to which the user is not granted the access right contains an expression indicating that the access right is not granted. Thus, to confirm whether or not the user is granted the access right to access the file, the user does not need to access the file or display a display screen for displaying information regarding the access right to access the file. In other words, an operation for confirming whether or not the user is granted the access right to access a file is performed easily.

EXAMPLE 3 OF MODIFICATION PROCESSING

An example of the case where a display request for displaying the names of the files illustrated in FIG. 3A is made by the user A of the terminal device 200 (hereinafter, may be simply referred to as a user) will be described. Although the example of the names of the files will be described below, similar processing may be performed for the names of folders.

FIG. 8 is a diagram illustrating an example of display on the display unit 250 of the terminal device 200 in the case where a display request for displaying the names of the files illustrated in FIG. 3A is made by the user. As described in detail later, FIG. 8 illustrates a state after the list of multiple files displayed as the window W1 on the display unit 250 is sorted by the names of the files.

In this example, in the case where there are multiple files to which the user is not granted the access right, the information processing unit 110 modifies the names of the files into character strings containing characters for sorting at the beginning of the names. A character for sorting is an example of the specific character string satisfying the predetermined condition.

In the case where the list of names of multiple files is displayed, names of files containing a character for sorting are displayed together in the same part. A character for sorting is not particularly limited and may be, for example, a combination of characters such as predetermined numbers and alphabets. Furthermore, the number of characters for sorting is not particularly limited and one or more characters may be used. Furthermore, characters for sorting provided at the beginning of the names of multiple files may be the same or part of the characters may be different.

The information processing unit 110 modifies a unique file name part "2020_0115_CustomerDirectory" of the name "2020_0115_CustomerDirectory.pdf" of the file to which the user is not granted the access right into a character string "001_0cu3r-fujnsu89alFk", which is the combination of characters "001" for sorting and a meaningless character string "0cu3r-fujnsu89alFk". In a similar manner, the information processing unit 110 modifies a unique file name part "emergency_contact_address_book" of the name "emergency_contact_address_book.xlsx" of the file to which the user is not granted the access right into a character string "002_Lxmx71psabCqjis", which is the combination of characters "002" for sorting and a meaningless character string "Lxmx71psabCqjis". In this example, extensions in the names of the files are maintained without being modified.

The terminal device 200 displays, as the window W1, the names of the files for which the user has made a display request on the display unit 250. Specifically, as illustrated in FIG. 8, in the window W1, the modified names "001_0cu3r-fujnsu89alFk.pdf" and "002_Lxmx71psabCqjis.xlsx", which are combinations of characters for sorting and meaningless character strings, of the files "2020_0115_CustomerDirectory.pdf" and "emergency_contact_address_book.xlsx" to which the user is not granted the access right are displayed.

Accordingly, even when the user sees the names of the files displayed in the window W1, the user is prevented from being able to guess the contents of the files "2020_0115_CustomerDirectory.pdf" "emergency_contact_address_book.xlsx" to which the user is not granted the access right.

Furthermore, in the case where the list of the multiple files displayed in the window W1 is sorted by the names of the files, the files to which the user is not granted the access right are displayed together in the same part in the list, as illustrated in FIG. 8, because the modified names of these files contain characters for sorting.

Specifically, when the list of multiple files displayed in the window W1 is sorted by the names of the files, the names of the files are rearranged in a predetermined order. When the list of multiple files is sorted in ascending order of name, the multiple files are rearranged such that, for example, the first characters in the names of the files are rearranged in the order of symbol, number, alphabet, katakana and hiragana, and kanji. Furthermore, in the case where the first characters are numbers, the names of the files are rearranged in ascending order of number. In the case where the first characters are alphabets, the names of the files are rearranged in ascending order of alphabet. In the case where the first characters are katakana characters or hiragana characters, the names of the files are rearranged in Japanese syllabary order.

In this example, the modified names of the files "2020_0115_CustomerDirectory.pdf" and "emergency_contact_address_book.xlsx" to which the user is not granted the access right contain character "001" and "002" for sorting at the beginning of the modified names. Accordingly, in the case where the list of the multiple files displayed in the window W1 is sorted by the names of the files, as illustrated in FIG. 8, the files "2020_0115_CustomerDirectory.pdf" and "emergency_contact_address_book.xlsx" to which the user is not granted the access right are displayed in the order mentioned above in an upper part of the list of the multiple files.

In the example described above, numbers "001" and "002" are used as characters for sorting. However, the characters for sorting are not limited to the example described above.

Furthermore, a character for sorting may be determined in advance and stored in the storing unit 120 or the like. Alternatively, for example, the information processing unit 110 may determine a character for sorting based on the name of a file whose name is not modified (that is, a file to which the user is granted the access right) out of files for which the user has made a display request.

Specifically, the information processing unit 110 obtains the names of files to which the user is not granted the access right, out of multiple files for which the user has made a display request, and determines characters for sorting such that the files to which the user is not granted the access right are rearranged above or below files to which the user is granted the access right in the case where the list of the multiple files is sorted by the names of the files.

For example, in the case where the first characters in the names of files to which the user is granted the access right are hiragana characters, katakana characters, or kanji characters, numbers and alphabets are determined to be used as characters for sorting. Accordingly, in the case where the list of multiple files is sorted by the names of the files, the modified names of files to which the user is not granted the access right are displayed together above files to which the user is granted the access right. In other words, the modified names of the files to which the user is not granted the access right and the names of the files to which the user is granted the access right are displayed in individual parts.

EXAMPLE 4 OF MODIFICATION PROCESSING

The information processing unit 110 modifies the name of a file to which the user is not granted the access right into a character string containing a predetermined extension. The predetermined extension is an example of the specific character string satisfying the predetermined condition.

In this example, the name of a file to which the user is not granted the access right is modified into a character string containing a predetermined extension. Thus, in the case where the names of multiple files displayed in the window W1 of the display unit 250 (see, for example, FIG. 6) are sorted by extension, the files to which the user is not granted the access right are displayed together in the same part.

EXAMPLE 5 OF MODIFICATION PROCESSING

An example of the case where a display request for displaying the names of the files illustrated in FIG. 3A is made by the user A of the terminal device 200 (hereinafter, may be simply referred to as a user) will be described. Although the example of the names of the files will be described below, similar processing may be performed for the names of folders.

FIG. 9 is a diagram illustrating an example of display on the display unit 250 of the terminal device 200 in the case where a display request for displaying the names of the files illustrated in FIG. 3A is made by the user.

In this example, the information processing unit 110 modifies the name of a file to which the user is not granted the access right into a character string containing the first one or more characters in the original name of the file. The first one or more characters in the original name is an example of the specific character string satisfying the predetermined condition.

Specifically, the information processing unit 110 modifies a unique file name part "2020_0115_CustomerDirectory" of the name "2020_0115_CustomerDirectory.pdf" of the file to which the user is not granted the access right into a character string "2020_011c3-unu9lk" by maintaining the first eight characters "2020_011" and modifying the characters "5_CustomerDirectory" after the eight characters into a meaningless character string "c3-unu9lk". In a similar manner, the information processing unit 110 modifies a unique file name part "emergency_contact_address_book" of the name "emergency_contact_address_book.xlsx" of the file to which the user is not granted the access right into a character string "emerxx1sbqi" by maintaining the first four characters "emer" and modifying the characters "gency_contact_address_book" after the four characters into a meaningless character string "xx1sbqi". In this example, extensions in the names of the files are maintained without being modified.

As described above, by modifying the name of a file to which the user is not granted the access right into a character string containing the first one or more characters in the original name, in the case where the names of multiple files are displayed in the window W1, the names of files to which the user is granted the access right and the modified names of files to which the user is not granted the access right are displayed in the order that these files are stored in the information processing device 100. In other words, the names of the multiple files in the window W1 are displayed in the same order as that before the names of the files to which the user is not granted the access right are modified.

In this example, the modified name of a file to which the user is not granted the access right contains the first one or more characters in the original name, and the characters after the one or more characters are modified into a meaningless character string. Thus, even when the user sees the names of the files displayed in the window W1, the user is prevented from being able to guess the contents of the files to which the user is not granted the access right, compared to the case where the names of the files to which the user is not granted the access right are not modified.

EXAMPLE 6 OF MODIFICATION PROCESSING

The example based on the assumption that a single type of access right is set for a folder or file has been described above. However, as described above, there may be multiple types of access right. Next, processing performed in the case where an access right includes a browsing right to browse the contents of a folder or file and an editing right to edit the contents of the folder or file will be described below.

FIG. 10 is a diagram illustrating an example of additional information of files stored in the storing unit 120. In FIG. 10, the names of the files and information of the access right to access the files granted or not granted to the user are illustrated.

An example of processing performed by the information processing unit 110 in the case where a display request for displaying the names of the files illustrated in FIG. 10 is made by the user of the terminal device 200 will be described. Although the example of the names of the files will be described below, similar processing may be performed for the names of folders.

Figure 11:
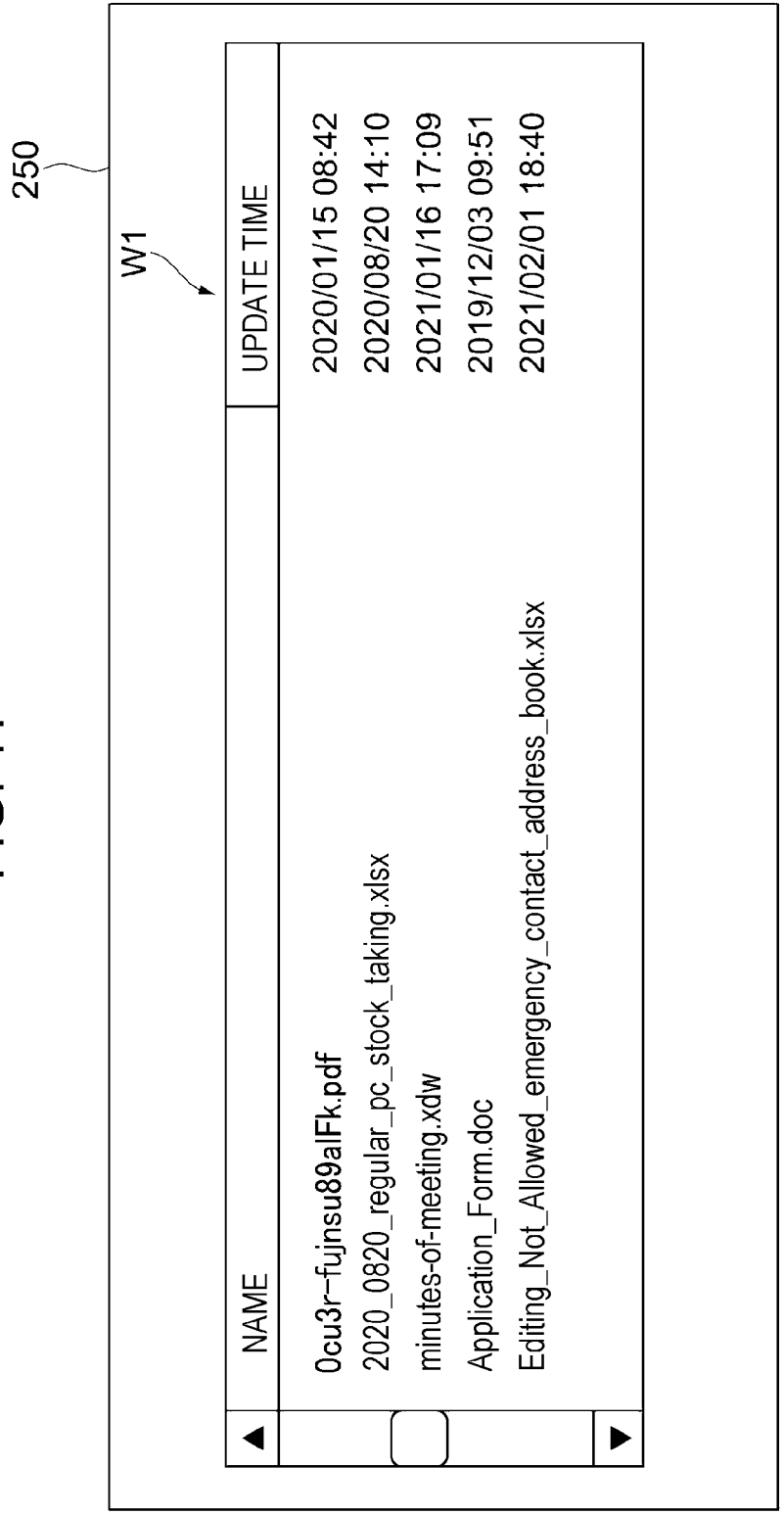
FIG. 11 is a diagram illustrating an example of display on the display unit of the terminal device in the case where a display request for displaying the names of the files illustrated in FIG. 3A is made by the user.

FIG. 11 is a diagram illustrating an example of display on the display unit 250 of the terminal device 200 in the case where a display request for displaying the names of the files illustrated in FIG. 10 is made by the user.

As illustrated in FIG. 10, the user is granted neither the browsing right nor the editing right as the access right to access the file "2020_0115_CustomerDirectory.pdf" out of the five files, "2020_0115_CustomerDirectory.pdf", "2020_0820_regular_pc_stock_taking.xlsx", "minutes-of-meeting.xdw", "Application_Form.doc", and "emergency_contact_address_book.xlsx", for which the user has made a display request. Furthermore, the use is granted the browsing right but is not granted the editing right as the access right to access the file "emergency_contact_address_book.xlsx" out of the files "2020_0115_CustomerDirectory.pdf", "2020_0820_regular_pc_stock_taking.xlsx", "minutes-of-meeting.xdw", "Application_Form.doc", and "emergency_contact_address_book.xlsx".

In this case, the information processing unit 110 may perform different types of modification processing for the files "2020_0115_CustomerDirectory.pdf" and "emergency_contact_address_book.xlsx" according to the type of access right granted or not granted to the user.

In this example, the information processing unit 110 modifies the name of the file to which the user is granted neither the browsing right nor the editing right as the access right into a meaningless character string.

Specifically, the information processing unit 110 modifies a unique file name part "2020_0115_CustomerDirectory" of the name "2020_0115_CustomerDirectory.pdf" of the file to which the user is granted neither the browsing right nor the editing right into a meaningless character string "0cu3r-fujnsu89alFk".

Furthermore, the information processing unit 110 modifies the name of the file to which the user is not granted the editing right as the access right (that is, the user is granted the browsing right) into a character string containing an expression indicating that the user is not granted the access right (editing right) to access the file. In this example, the information processing unit 110 modifies the name of the file to which the user is not granted the editing right as the access right into a character string containing both an expression indicating that the user is not granted the editing right as the access right to access the file and the original name of the file.

Specifically, the information processing unit 110 modifies a unique file name part "emergency_contact_address_book" of the name "emergency_contact_address_book.xlsx" of the file to which the user is not granted the editing right into a character string "Editing_Not_Allowed_emergency_contact_address_book", which is the combination of "Editing_Not_Allowed" indicating that the access right is not granted and the original file name "emergency_contact_address_book".

In this example, extensions in the names of the files are maintained without being modified.

Then, the terminal device 200 displays, as the window W1, the names of the files for which the user has made a display request on the display unit 250. Specifically, as illustrated in FIG. 11, in the window W1, the modified name "0cu3r-fujnsu89alFk.pdf", which is a meaningless character string, of the file "2020_0115_CustomerDirectory.pdf" to which the user is granted neither the browsing right nor the editing right as the access right is displayed.

Accordingly, even when the user sees the names of the files displayed in the window W1, the user is prevented from being able to guess the contents of the file "2020_0115_CustomerDirectory.pdf" to which the user is granted neither the browsing right nor the editing right.

Furthermore, as illustrated in FIG. 11, in the window W1, the modified name "Editing_Not_Allowed_emergency_contact_address_book.xlsx", which is the combination of an expression indicating that the access right is not granted and the original name, of the file "emergency_contact_address_book.xlsx" to which the user is granted the browsing right but is not granted the editing right as the access right is displayed.

Since the user is granted the browsing right to browse the file "emergency_contact_address_book.xlsx", there is no problem if the user guesses the contents of the file. In other words, in this example, the modified name "Editing_Not_Allowed_emergency_contact_address_book.xlsx" of the file "emergency_contact_address_book.xlsx" contains the original name of the file. Thus, the user is able to guess the contents of the file from the displayed name of the file and to browse the file as necessary.

<Processing for Operation on Terminal Device 200>

Next, processing performed by the information processing unit 110 of the information processing device 100 in the case where after the names of folders or files are displayed on the display unit 250 on the basis of an output list output from the information processing device 100, an operation for the name of a folder or file displayed on the display unit 250 is performed by the user will be described.

The user of the terminal device 200 selects, for example, using the operation reception unit 240, the name of a folder or file displayed in the window W1 or W2 on the display unit 250 (see, for example, FIG. 6) and performs an operation such as opening, deleting, copying, or moving the selected folder or file. The information processing unit 210 of the terminal device 200 outputs the name of the folder or file for which the operation has been performed by the user and information regarding the operation to the information processing device 100. As described above, on the display unit 250, original names are displayed for folders or files to which the user is granted the access right, and modified names obtained by the processing of the information processing unit 110 are displayed folders or files to which the user is not granted the access right. Thus, in the case where the user has performed an operation for a folder or file to which the user is granted the access right, the information processing unit 210 outputs the original name to the information processing device 100. In contrast, in the case where the user has performed an operation for a folder or file to which the user is not granted the access right, the information processing unit 210 outputs the modified name to the information processing device 100.

The information processing unit 110 of the information processing device 100 compares the name of the folder or file received from the terminal device 200 with the name of a folder or file stored in the storing unit 120.

In the case where the user has performed an operation for a folder or file to which the user is granted the access right, the original name of the folder or file is output to the information processing device 100 from the terminal device 200. Thus, the name of the folder or file received from the terminal device 200 is the same as the name of a folder or file stored in the storing unit 120. Therefore, the information processing unit 110 performs the operation performed by the user on the folder or file whose name is the same as the name of the folder or file received from the terminal device 200.

In contrast, in the case where the user has performed an operation for a folder or file to which the user is not granted the access right, the modified name of the folder or file is output to the information processing device 100 from the terminal device 200. In this case, none of the names of the folders or files stored in the storing unit 120 are the same as the name of the folder or file received from the terminal device 200 (that is, the modified name).

Therefore, the information processing unit 110 does not perform the operation performed by the user on any of the folders or files. Then, the information processing unit 110 transmits an error notification indicating that the operation is unable to be performed to the terminal device 200.

<Restoration Processing for Modified Name by Information Processing Unit 110>

Next, an example of processing performed by the information processing unit 110 in the case where after the name of a folder or file to which the user is not granted the access right is modified, the access right to access the folder or file is granted to the user will be described.

As described above, the information processing unit 110 modifies, in accordance with the predetermined modification rule, the name of a folder or file to which the user is not granted the access right. The information processing unit 110 may perform, in the case where the access right to access the folder or file whose name has been modified is granted to the user, processing for restoring the original name from the modified name of the folder or file, in accordance with the modification rule.

Then, the information processing unit 110 outputs the restored name of the folder or file to the terminal device 200 via the communication I/F 130.

The terminal device 200 receives the restored name of the folder or file, and displays the restored name of the folder or file on the display unit 250. The user is able to guess the contents of the folder or file from the restored name of the folder or file displayed on the display unit 250 and to perform an operation such as browsing, editing, or the like on the folder or file as necessary.

Exemplary embodiments of the present disclosure have been described above. However, the technical scope of the present disclosure is not limited to the scope of the exemplary embodiments described above. It is obvious from the description of the claims that various modifications and improvements made to the foregoing exemplary embodiments are included in the technical scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
    a hardware processor configured to:
        in a case where a request for displaying a name of a folder or a file stored in a memory is received from a terminal device, modify a name of a folder or a file to which a user of the terminal device is not granted an access right into a different character string and output the modified character string to the terminal device,
        wherein the hardware processor is configured to modify the name of the folder or the file to which the user of the terminal device is not granted the access right into a character string containing an expression indicating that the access right is not granted,
        wherein the hardware processor is further configured to modify the name of the folder or the file to which the user of the terminal device is not granted the access right into a meaningless character string, and the meaningless character string is a character string presenting information in sequence of characters that does not convey any recognizable or understandable information.

2. The information processing device according to claim 1, wherein the hardware processor is configured to modify the name of the folder or the file to which the user of the terminal device is not granted the access right into a character string containing a specific character string satisfying a predetermined condition.

3. The information processing device according to claim 2, wherein the hardware processor is configured to modify the name of the folder or the file to which the user of the terminal device is not granted the access right into a character string containing a character for sorting at beginning of the character string.

4. The information processing device according to claim 3, wherein the hardware processor is configured to determine the character for sorting, based on a name of a folder or a file to which the user of the terminal device is granted the access right.

5. The information processing device according to claim 2, wherein the hardware processor is configured to modify the name of the folder or the file to which the user of the terminal device is not granted the access right into a character string containing a first one or more characters of the name of the folder or the file.

6. The information processing device according to claim 2, wherein the hardware processor is configured to modify the name of the folder or the file to which the user of the terminal device is not granted the access right into a character string containing a predetermined extension.

7. The information processing device according to claim 1, wherein the hardware processor is configured to modify, in accordance with a predetermined modification rule, the name of the folder or the file to which the user of the terminal device is not granted the access right.

8. The information processing device according to claim 7, wherein the hardware processor is configured to, in a case where the access right to access the folder or the file whose name has been modified is granted the user of the terminal device, restore a name in accordance with the modification rule and output the restored name to the terminal device.

9. The information processing device according to claim 1, wherein the hardware processor is configured to modify the name of the folder or the file in a different manner in accordance with a type of access right to access the folder or the file that the user of the terminal device is not granted.

10. An information processing method comprising:
    in a case where a request for displaying a name of a folder or a file stored in a memory is received from a terminal device, modifying a name of a folder or a file to which a user of the terminal device is not granted an access right into a different character string and output the modified character string to the terminal device;
    modifying the name of the folder or the file to which the user of the terminal device is not granted the access right into a character string containing an expression indicating that the access right is not granted; and
    modifying the name of the folder or the file to which the user of the terminal device is not granted the access right into a meaningless character string, and the meaningless character string is a character string presenting information in sequence of characters that does not convey any recognizable or understandable information.

11. A non-transitory computer readable medium storing a program causing a computer to execute a process, the process comprising:
    in a case where a request for displaying a name of a folder or a file stored in a memory is received from a terminal device, modifying a name of a folder or a file to which a user of the terminal device is not granted an access right into a different character string and output the modified character string to the terminal device;
    modifying the name of the folder or the file to which the user of the terminal device is not granted the access right into a character string containing an expression indicating that the access right is not granted; and
    modifying the name of the folder or the file to which the user of the terminal device is not granted the access right into a meaningless character string, and the meaningless character string is a character string presenting information in sequence of characters that does not convey any recognizable or understandable information.

* * * * *